United States Patent
Choyi et al.

(10) Patent No.: US 12,389,250 B2
(45) Date of Patent: Aug. 12, 2025

(54) SYSTEMS AND METHODS FOR DYNAMIC AUTHORIZATION OF EXTERNAL DEVICES FOR NETWORK ACCESS

(71) Applicant: Verizon Patent and Licensing Inc., Basking Ridge, NJ (US)

(72) Inventors: Vinod Kumar Choyi, Conshohocken, PA (US); Samita Chakrabarti, Bedminster, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 432 days.

(21) Appl. No.: 18/149,180

(22) Filed: Jan. 3, 2023

(65) Prior Publication Data
US 2024/0224092 A1  Jul. 4, 2024

(51) Int. Cl.
*H04W 12/08* (2021.01)
*H04W 24/08* (2009.01)
*H04W 48/02* (2009.01)

(52) U.S. Cl.
CPC ........... *H04W 24/08* (2013.01); *H04W 48/02* (2013.01)

(58) Field of Classification Search
CPC ..... H04W 12/00; H04W 12/06; H04W 12/08; H04W 12/084; H04W 12/086; H04W 12/088; H04W 12/10; H04W 12/104; H04W 12/108; H04W 12/30; H04W 12/37; H04W 12/40; H04W 24/08; H04W 48/02; H04W 48/04; H04W 48/06
See application file for complete search history.

(56) References Cited

U.S. PATENT DOCUMENTS

| | | | |
|---|---|---|---|
| 2022/0210655 A1* | 6/2022 | Feldmann | H04W 4/025 |
| 2024/0056485 A1* | 2/2024 | Xu | H04L 63/20 |
| 2024/0098504 A1* | 3/2024 | Demonget | H04W 8/18 |

FOREIGN PATENT DOCUMENTS

| | | | |
|---|---|---|---|
| WO | WO 03/065754 | * | 8/2003 |
| WO | WO 2018/013925 | * | 1/2018 |

* cited by examiner

*Primary Examiner* — Frank Duong

(57) ABSTRACT

A system described herein may monitor information associated with a set of User Equipment ("UEs") associated with a first network, and may receive an access request, for access to a first UE of the set of UEs, from a second UE associated with a second network. The system may obtain, based on the access request and from the second network, monitored information associated with the second UE. The system may identify monitored information associated with the first UE and a particular access policy that is associated with the first UE and the second UE. The system may identify, based on the particular access policy, the monitored information associated with the first UE, and the monitored information associated with the second UE, whether to grant or deny the access request. The system may output, in response to the access request, an indication of whether the access request is granted or denied.

20 Claims, 8 Drawing Sheets

SYSTEMS AND METHODS FOR DYNAMIC AUTHORIZATION OF EXTERNAL DEVICES FOR NETWORK ACCESS

BACKGROUND

Wireless networks may provide services to User Equipment ("UEs"), such as mobile telephones, Internet of Things ("IoT") devices, or other wireless devices. Different wireless networks may be owned and/or operated by different entities, or operators. Additionally, UEs may be registered, provisioned, etc. with certain networks that may perform functions such as authenticating UEs using network credentials (e.g., as maintained by a SIM ("Subscriber Identification Module") card by UEs), maintaining usage or charging information, or the like.

DETAILED DESCRIPTION OF EXAMPLE EMBODIMENTS

The following detailed description refers to the accompanying drawings. The same reference numbers in different drawings may identify the same or similar elements.

Embodiments described herein provide for intercommunication between different wireless networks in order to authenticate UEs that are associated with different networks (e.g., UEs that are associated with different "home" networks). A "home" network with respect to a given UE, as discussed herein, may refer to a wireless network that provisions network authentication credentials for the UE, that maintains charging or subscription service information for the UE, and/or performs other suitable operations with respect to the UE. Embodiments described herein provide for a first wireless network to maintain access policies associated with UEs that are associated with a second network as their respective home networks. Further, the access policies may include policies associated with UEs associated with the first network as their respective home networks. For example, the access policies may include criteria, conditions, etc. related to UEs of both the first and second networks, such as location, device integrity or operating status, security risk measurement scores, UE roles, and/or other parameters. In this manner, one network may be able to leverage authentication mechanisms, authorization mechanisms, location determination, device status, and/or other techniques implemented by another as well as such techniques implemented by the network itself, in order to provide for dynamic access control to the network.

Figure 1:
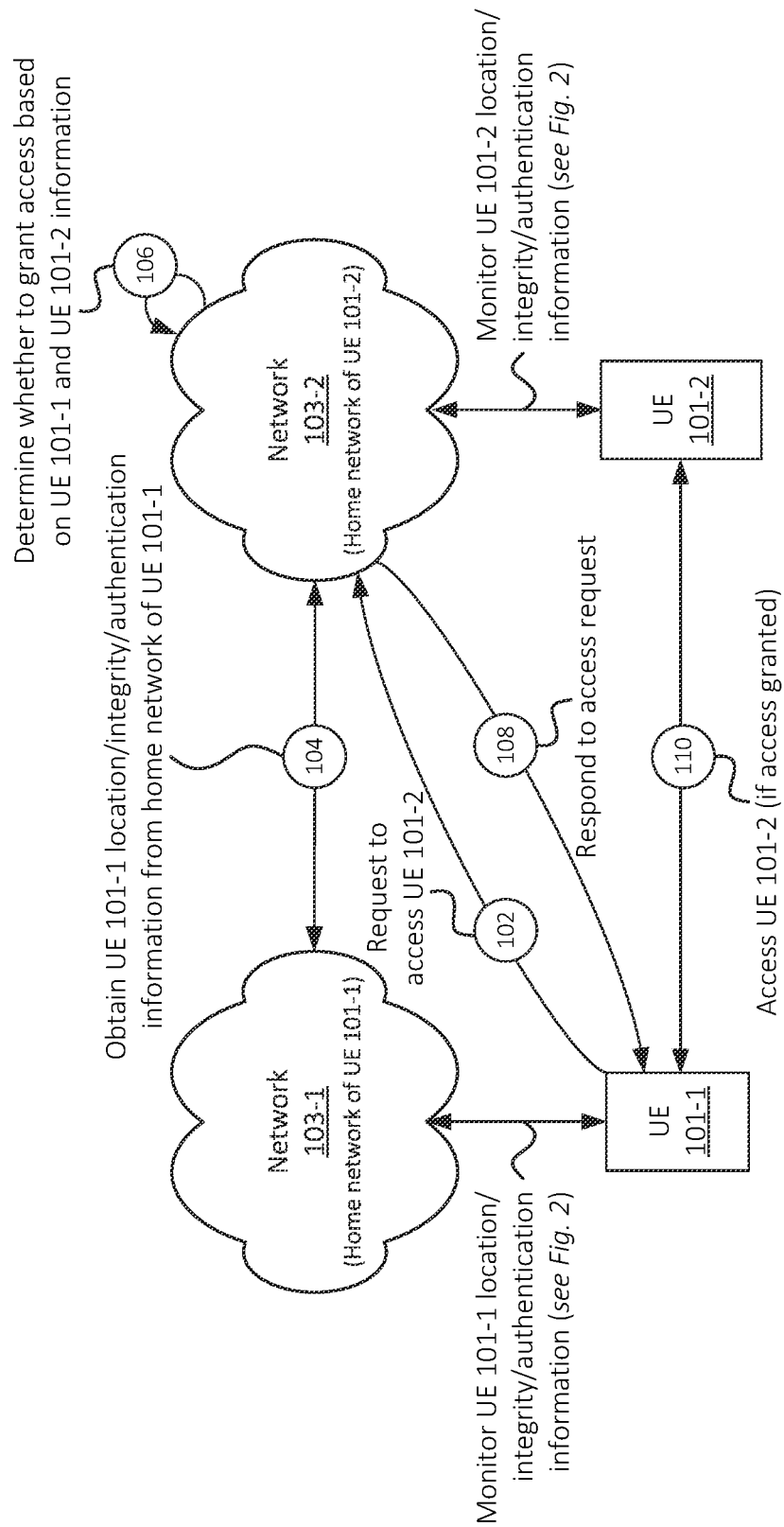
FIG. 1 illustrates an example overview of one or more embodiments described herein.

For example, as shown in FIG. 1, UE 101-1 may be associated with a first network 103-1, and UE 101-2 may be associated with a second network 103-2. For example, network 103-1 may be a home network of UE 101-1, and network 103-2 may be a home network of UE 101-2. Networks 103-1 and 103-2 may each be, or may each include, a mobile network, a public network, a private network, a wireless network, etc.

In some embodiments, networks 103-1 and 103-2 may be different types of networks and/or may otherwise have differing attributes. For example, network 103-1 may be a mobile network (e.g., an Long-Term Evolution ("LTE") network, a Fifth Generation ("5G") network, or the like), and network 103-2 may be a private network. The private network may include one or more gateways, firewalls, routers, etc. and/or other mechanisms to restrict access or visibility to unauthorized devices. In some embodiments, the private network may be implemented by, and/or may utilize, some of the same resources as network 103-1. For example, network 103-1 may include wireless network infrastructure resources such as base stations, radios, antennas, RAN controllers, or the like, and may allocate portions of these resources for use by network 103-2. For example, network 103-1 may allocate a portion of radio frequency ("RF") bandwidth, spectrum, etc. for use by network 103-2. In some embodiments, network 103-2 may be separate from network 103-1, inasmuch as networks 103-1 and 103-2 may utilize no common resources. For example, network 103-2 may include a private wireless local area network ("WLAN") implemented by WiFi access points, routers, etc.

Figure 2:
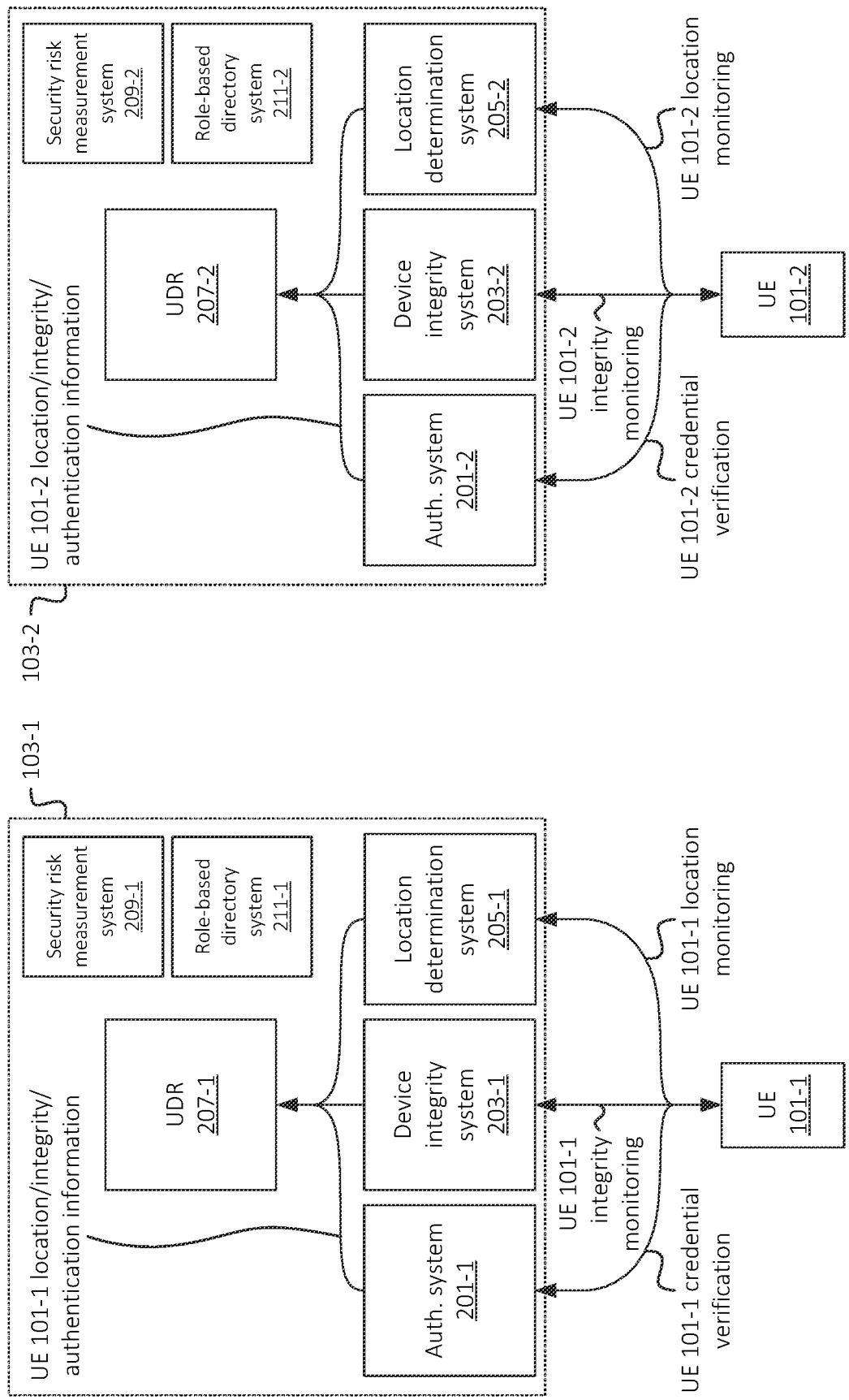
FIG. 2 illustrates an example of UE information determination by two separate networks, in accordance with some embodiments.

As discussed herein, networks 103-1 and 103-2 (sometimes referred to in plural as "networks 103") may monitor or maintain authentication information, authorization information, location information, device integrity information, security risk measurement score, role associate with the device, and/or other suitable information associated with UEs 101-1 and 101-2 (sometimes referred to in plural as "UEs 101"), respectively. For example, as shown in FIG. 2, networks 103 may include one or more network elements or other devices or systems that determine, monitor, and/or maintain such information.

For example, network 103-1 may include authentication and authorization system 201-1 (referred to herein as "authentication system" for the sake of brevity), device integrity system 203-1, location determination system 205-1, security risk measurement system 209-1, and role-based directory system 211-1; and network 103-2 may include authentication system 201-2, device integrity system 203-2, location determination system 205-2, security risk measurement system 209-2, and role-based directory system 211-2. As similarly noted above, authentication system 201, device integrity system 203, and location determination system 205 may include and/or may be implemented by different types or arrangements of devices or systems with respect to different networks 103. For example, network 103-1 may utilize a first type of authentication system 201-1 that uses a first type of authentication mechanism to authenticate UEs (e.g., UE 101-1), while network 103-2 utilizes a second type of authentication system 201-2 that uses a different second type of authentication mechanism to authenticate UEs (e.g., UE 101-2). Further, in some embodiments, authentication system 201, device integrity system 203, location determination system 205, security risk measurement system 209, and/or role-based directory system 211 of different networks 103 may perform different sets of functionality, such as some or all of the operations discussed below, or a portion thereof. For example, authentication system 201-2 of network 103-2 may communicate with elements of network 103-1, as discussed below, but authentication system 201-1 of network 103-1 may not be configured to communicate with elements of network 103-2 in a similar manner. On the other hand, authentication system 201, device integrity system 203, location determination system 205, security risk measurement system 209, and/or role-based directory system 211 of different networks 103 may perform identical or similar functionality with respect to UEs 101 of the different networks 103.

As shown, authentication system 201 may authenticate respective UEs 101, such as by verifying that credentials (e.g., a Subscription Permanent Identifier ("SUPI"), a Globally Unique Temporary Identifier ("GUTI"), and/or some other suitable credentials or values) provided by UEs 101 are accurate and/or otherwise satisfy authentication procedures implemented by network 103. Additionally, or alternatively, authentication system 201 may authenticate respective UEs 101 by verifying a user name, password, biometric information, cryptographic keys and/or values derived based on such keys, an authentication token, an authorization token (e.g., an OAuth token, a Security Assertion Markup Language ("SAML") assertion, etc.), and/or other suitable authentication and/or authorization information.

In some embodiments, UEs 101 may include a SIM card, a Universal Integrated Circuit Card ("UICC"), an embedded SIM ("eSIM"), a key repository (e.g., storing one or more keys such as public/private key pairs), and/or some other authentication mechanism by which UEs 101 may communicate with authentication system 201 to perform an authentication procedure. In some embodiments, authentication system 201 may include an Authentication, Authorization, Accounting ("AAA") system, an Authentication Server Function ("AUSF"), a proprietary or non-standard authentication system, etc. Authentication system 201 may maintain and/or provide authentication and/or authorization information associated with UE 101-1, such as an indication of when UE 101-1 was authenticated by authentication system 201-1 (e.g., a timestamp), a type of authentication performed (e.g., verification of SIM credentials, verification of a user name or password, verification of biometric information, etc.), and/or other suitable information. Authorization information may include the resources that a UE 101-1 is allowed to access, the duration of access, expiration of the authorization information and one or more granular services or resources that the UE 101-1 is authorized for, also sometimes referred to as "scope."

Device integrity system 203 may monitor, determine, etc. a measure of device integrity, operational status, device health, and/or other suitable measures (referred to herein simply as "device integrity" for the sake of brevity). Device integrity of UE 101 may include and/or may be based on, for example, a determination that UE 101 is operational, powered on, has connectivity, etc. Such status may be determined based on, for instance, "ping" messages sent to UE 101 and responses thereto, "heartbeat" messages periodically and/or intermittently sent by UE 101 to device integrity system 203, and/or other suitable techniques. In some embodiments, device integrity may include an indication of whether UE 101 is in a "lost" mode, such as a reduced-functionality mode in which only emergency calls are able to be made and/or in which additional measures are required to be taken (e.g., in addition to a "screen unlock" function) in order to access or "unlock" UE 101.

As another example, device integrity may include a verification that UE 101 has a particular operating system, firmware version, application or application suite, or other set of software installed or executing at UE 101. In some embodiments, device integrity may include a measurement of one or more values associated with the various components of the UE 101 (e.g., software, firmware, hardware, configuration files, etc.) that indicate that the components are operating according within acceptable parameters and that an attacker has not tampered with any of the components. In some embodiments, device integrity may include a verification of device health parameters associated with UE 101, such as at least a threshold battery level (e.g., at least 50% charged, at least 80% charged, etc.), at least a threshold amount of processing and/or memory resources available, no water immersion flags, etc. In some embodiments, device integrity may include or may be based on sensor information measured by one or more sensors of UE 101 such as an accelerometer (e.g., which may indicate drops, impacts, or other damage to UE 101), a thermometer (e.g., which may indicate UE 101 overheating), a camera, and/or other sensors or input devices of UE 101. In some embodiments, device integrity information may include other suitable types of information that may be collected, maintained, provided, etc. by UE 101. In some embodiments, UE 101 may communicate with device integrity system 203 via an application programming interface ("API"), an application executing at UE 101 (e.g., which is configured to communicate with device integrity system 203), a web portal associated with device integrity system 203, and/or some other suitable communication pathway.

Location determination system 205 may monitor, determine, receive, etc. location information associated with UE 101. For example, location determination system 205 may include, may be implemented by, and/or may be communicatively coupled to, a mobility management system of network 103, such as a Mobility Management Entity ("MME"), an Access and Mobility Management Function ("AMF"), or other suitable device or system of network 103. In some embodiments, location determination system 205 may communicate with base stations of a RAN associated with network 103 in order to determine the location (e.g., using triangulation or other suitable techniques) of UE 101. Additionally, or alternatively, location determination system 205 may receive location information from UE 101, which may be determined by UE 101 using geographical Global Positioning System ("GPS") techniques, geofencing techniques, and/or other suitable techniques.

Security risk measurement system 209 may include components that determine or indicate a measure of potential risk that UE 101 poses to the network and the data within the network. Security risk measurement system 209 may include components that check for security vulnerabilities (e.g., vulnerable coding such a buffer overflow), lack of system hardening, and penetration testing of the UE 101. The measure of potential risk may additionally, or alternatively, be based on static application security testing ("SAST") performed with respect to UE 101 and/or dynamic application security testing ("DAST") of UE 101. The results from the various security testing may be used based (e.g., as a weighted average) for a consolidated security risk measurement value for a UE 101.

Role-based directory system 211 may make use of database or a list of roles or groups to which the UE 101 may belong. Roles may be pre-assigned based on certain characteristics (e.g., type of UE 101, application running on the UE 101, administrator operating the UE 101, etc.) of a given UE 101. The roles of such UE 101 may be re-assigned if one or more characteristics changes or if the policy changes are made within the network.

In some embodiments, a particular device or system of each network 103, such as Unified Data Repository ("UDR") 207-1 of network 103-1 or UDR 207-2 of network 103-2, may receive some or all of the information (e.g., authentication and/or authorization information, device integrity information, location information, security risk measurement information, role/group information, etc.) associated with respective UEs 101. In some embodiments, some other device or system of network 103-1 and/or network 103-2 may maintain the authentication information, device integrity information, location information, security risk measurement information, and role/group information.

Returning to FIG. 1, UE 101-1 may request (at 102) access to UE 101-2. As discussed above, network 103-1 may be a home network of UE 101-1, and network 103-2 may be a home network of UE 101-2. The access request (at 102) may, for example, be sent from UE 101-1 to UE 101-2 (e.g., using an Internet Protocol ("IP") address, Uniform Resource Locator ("URL"), Mobile Directory Number ("MDN"), Subscription Permanent Identifier ("SUPI"), International Mobile Subscriber Identity ("IMSI"), a temporary identifier, and/or other identifier of UE 101-2). In this sense, UE 101-1 may be referred to herein as a "requesting UE," and UE 101-2 may be referred to as a "target UE" (e.g., for which access is being requested).

The request may be sent via network 103-1, network 103-2, and/or some other network (e.g., the Internet). In some embodiments, the request may be sent by a device other than UE 101-1 (e.g., a workstation, a laptop, a wearable device, another UE, etc.), and may indicate that UE 101-1 is requesting access to receive a particular service and/or otherwise communicate with UE 101-2. In some embodiments, the request may be received by UE 101-2 and may be forwarded by UE 101-2 to authentication system 201-2. Additionally, or alternatively, the request may be sent to authentication system 201-2, and/or some other network element of network 103-2 may receive the request and forward the request to authentication system 201-2.

As described in more detail below, network 103-2 (e.g., authentication system 201-2 of network 103-2) may obtain (at 104) information associated with UE 101-1, such as location information, device integrity information, authentication and/or authorization information, security risk measurement information, role/group information, and/or other suitable information, from the home network of UE 101-1 (i.e., network 103-1, in this example). Based on obtaining (at 104) the information regarding UE 101-1 from network 103-1, and further based on location information, device integrity information, authentication and/or authorization information, security risk measurement information, role/group information, and/or other suitable information associated with UE 101-2, network 103-2 may determine (at 106) whether to grant the requested access. For example, as discussed below, network 103-2 may maintain access policies including conditions, parameters, etc. relating to location information, device integrity information, authentication and/or authorization information, security risk measurement information, role/group information, and/or other suitable information associated with UEs that are associated with network 103-2 as a home network (e.g., UE 101-2), as well as UEs that are not associated with network 103-2 as a home network (e.g., UE 101-1). In this sense, status changes, configuration changes, security risk measurement value changes, role/group information changes, location changes, and/or other dynamic information with respect to UEs that have differing networks as their home networks, may be able to be readily accounted for and used to dynamically determine whether to grant access to UEs of other networks to communicate with UEs associated with network 103-2.

Accordingly, network 103-2 may respond (at 108) to the access request, such as by indicating to UE 101-1 that the requested access has been granted, has been granted with certain parameters or restrictions (e.g., a time limit, a restriction on types of traffic or services, etc.), or has been denied. In some embodiments, network 103-2 may perform one or more other actions, such as notifying UE 101-2 that UE 101-1 has been granted access to communicate with UE 101-2. In such situations, UEs 101-1 and 101-2 may proceed to communicate (at 110) with each other in order to provide the requested service or other type of communication.

Figure 3:
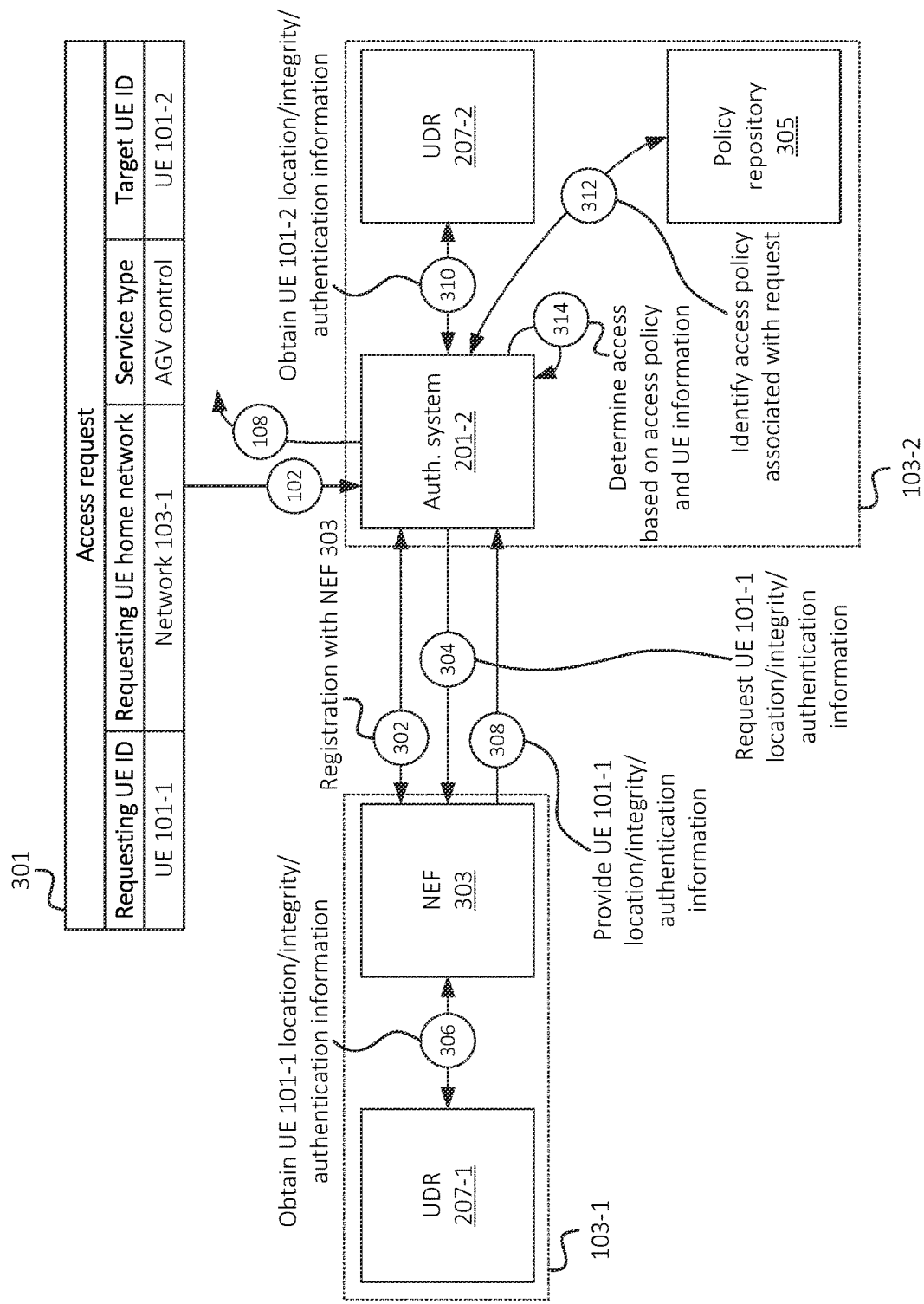
FIG. 3 illustrates an example of a dynamic authentication of an external UE for access to a network, in accordance with some embodiments.

As shown in FIG. 3, example access request 301 may be received (at 102) by authentication system 201-2 of network 103-2. In some embodiments, access request 301 may include an identifier of the requesting UE. In this example, the identifier may include an identifier of UE 101-1, such as an International Mobile Station Equipment Identity ("IMEI") value, a Generic Public Subscription Identifier ("GPSI"), a SUPI value, an IMSI value, an MDN, an IP address, or other suitable identifier of UE 101-1. Generally, the UE identifier may be an identifier that may be used by the home network of UE 101-1 to identify records, authentication and/or authorization information, or other information associated with UE 101-1.

In some embodiments, access request 301 may include an identifier of a home network of UE 101-1, such as a Public Land Mobile Network ("PLMN") identifier, an IP address (e.g., an IP address, or other locator information of a gateway, interface, etc. of network 103-1), a realm name, a domain name, a carrier name, or other suitable network identifier. Generally, the network identifier may be used by authentication system 201-2 to identify which particular network 103 to communicate with in order to obtain the location information, device integrity information, authentication information, security risk measurement information, role/group information, and/or other suitable information associated with UE 101-1. In this sense, network 103-2 may be considered a "roaming" network with respect to UE 101-1, a "non-native" network with respect to UE 101-1, a "non-home" network with respect to UE 101-1, etc. Additionally, or alternatively, UE 101-1 may be considered a "roaming," "external," "non-native," etc. UE with respect to network 103-2, and/or otherwise may be considered a UE for which network 103-2 is not a home network. As noted above, network 103-2 may be a private network and/or a different type of network than network 103-1, and may utilize different techniques, schemes, methodologies, etc. for UE authentication and/or authorization, device integrity verification, security risk measurement information, role/group information, UE location monitoring, etc.

Access request 301 may further include a service type. A service type may include, for example, an identifier or descriptor of a category of services, such as "automated guided vehicle ("AGV") control," "web browsing," "content streaming," "sensor monitoring," and/or other categories. In some embodiments, a service type may include an identifier or descriptor of a particular application, such as an application name, an application identifier, etc.

Access request 301 may additionally, or alternatively, include an identifier of a target UE (i.e., UE 101-2, in this example). For example, the identifier of the target UE may include an IP address, SUPI, temporary identifier (e.g., GUTI, 5G-GUTI, Temporary Mobile Subscriber Identity ("TMSI"), etc.) or other identifier of UE 101-2. The IP address or other identifier may, in some embodiments, be specifically indicated in the request (e.g., may be specified by the requesting UE 101-1). Additionally, or alternatively, the IP address or other identifier may be provided by one or more routing elements of network 103-2, which may have performed network address translation ("NAT"), mapping, and/or other suitable operations to translate, convert, etc. an identifier provided by requesting UE 101-1 to the IP address or other identifier of UE 101-2 within network 103-2. The identifier of the target UE may include some other identifier of UE 101-2 in addition to or in lieu of an IP address, such as an MDN, a device name, and/or some other suitable identifier. In some situations, a temporary identifier (e.g., a 5G-GUTI) may be mapped to a SUPI, such that privacy of UE 101-2 is not compromised to elements external to network 103-2, and preventing physical tracking of UE 101-2.

In some embodiments, authentication system 201-2 and/or some other element of network 103-2 may maintain mapping information that associates UE 101-2 and/or a group of UEs (e.g., including UE 101-2) to a particular service type. For example, access request 301 may indicate a service type but may not include an identifier of UE 101-2. In such examples, authentication system 201-2, a routing element of network 103-2, a load balancer, and/or some other device or system may determine (e.g., based on the mapping information) that UE 101-2 is associated with the requested service type. As another example, access request 301 may indicate an identifier of UE 101-2 but may not include an indication of the requested service type. In such examples, authentication system 201-2, a routing element of network 103-2, a load balancer, and/or some other device or system may determine (e.g., based on the mapping information) that access request 301, directed toward UE 101-2, is a request for a particular service type.

Based on receiving (at 102) access request 301, authentication system 201-2 may identify that the requesting UE 101-1 is associated with network 103-1 (e.g., as a home network of UE 101-1). As shown in FIG. 3, authentication system 201-2 may register (at 302) with network 103-1. For example, authentication system 201-2 may register (at 302) with network 103-1 based on receiving (at 102) access request 301, and/or may have registered with network 103-1 at some prior time. The registration (at 302) with network 103-1 may include registering with an network information exposure element of network 103-1, such as Network Exposure Function ("NEF") 303, a Service Capability Exposure Function ("SCEF"), and/or some other suitable device or system. NEF 303 may, for example, perform authentication and authorization functions in order to authenticate information requests from authentication system 201-2, and to provide types or amounts of information that authentication system 201-2 is authorized to receive. That is, NEF 303 may, in some embodiments, maintain information indicating which devices or systems are authorized to receive different types of information. In this manner, different networks 103 and/or elements thereof (e.g., respective authentication systems 201 and/or other network elements) may be authorized to receive different types of information, such as information associated with different groups of UEs 101 that are associated with network 103-1 as a home network.

For example, as part of the registration (at 302), NEF 303 may maintain information indicating that authentication system 201-2 is authorized to access location information associated with some or all UEs 101 registered with network 103-1 as a home network, device integrity information associated with some or all UEs 101 registered with network 103-1 as a home network, and authentication information associated with some or all UEs 101 registered with network 103-1 as a home network. In some embodiments, types of information that are not registered (at 302) as being authorized for authentication system 201-2 to access may not be available to authentication system 201-2. For example, in some situations, NEF 303 may receive or maintain other information, such as usage or billing information associated with one or more UEs 101. In the event that authentication system 201-2 has not been registered (at 302) as being authorized to access such information, authentication system 201-2 may not be able to access this information (e.g., requests for such information may be denied).

In some embodiments, the authorization information, maintained by NEF 303 with respect to authentication system 201-2, may indicate parameters, constraints, characteristics, etc. of access. For example, NEF 303 may maintain information indicating that authentication system 201-2 is authorized to receive the last one hour of location history with respect to a particular set of UEs 101, but that another authentication system 201 (e.g., associated with a different network 103) is authorized to receive the last two hours of location history with respect to the same particular set of UEs 101. As another example, NEF 303 may maintain information indicating that authentication system 201-2 is authorized to request the initiation of an authentication procedure with respect to one or more UEs 101, but that another authentication system 201 (e.g., associated with a different network 103) is not authorized to request the initiation of an authentication procedure with respect to the same one or more UEs 101. For instance, authentication system 201-2 may be authorized to request that one or more elements of network 103-1 (e.g., authentication system 201-2) perform an authentication procedure to verify credentials of UE 101-1 in response to the request from authentication system 201-2, whereas the other authentication system 201 may only be authorized to receive results of a previously performed authentication (e.g., credential verification) of UE 101-1. As another example, authentication system 201-2 may be authorized to perform an authentication and authorization procedure to verify credentials of UE 101-1 using secondary credentials that may be provided by or associated with network 103-2, and are used by UE 101-1. The authentication and authorization procedures may be performed using a secondary authentication mechanism or network slice-specific authentication and authorization procedures. In such a scenario, UE 101-1 may have an existing or prior relationship with network 103-2.

As another example, NEF 303 may maintain information indicating different parameters of authorized information based on different service types. For example, NEF 303 may maintain information indicating that authentication system 201-2 is authorized to receive one hour of UE location history for a "AGV control" service, but is only authorized to receive five minutes of UE location history for a "content streaming" service.

Based on identifying that the requesting UE 101-1 is associated with network 103-1, with which authentication system 201-2 has previously registered (at 302), authentication system 201-2 may request (at 304) information associated with UE 101-1. The request (at 304) may include the identifier of UE 101-1 included in access request 301. In some embodiments, the request (at 304) may include other information, such as an identifier of network 103-2, the requested service type, and/or an identifier of the target UE 101-2. NEF 303 may determine, based on the registration (at 302) of authentication system 201-2 that authentication system 201-2 is authorized to receive the requested information, or at least a portion of the requested information (e.g., is authorized to receive some but not all location information associated with UE 101-1, or in some instances authentication system 201-2 is authorized to receive all available location information associated with UE 101-1).

In some embodiments, the request (at 304) may include an identifier of network 103-2 or of authentication system 201-2 and an identifier of UE 101-1, but may not include the service type and/or the identifier of the target UE 101-2. In such situations, NEF 303 may determine which types of information, and/or parameters of such information, that authentication system 201-2 is authorized to access based on the previous registration (at 302) of authentication system 201-2. For example, as noted above, different networks 103 and/or authentication systems 201 may be authorized to access different types of information. In some situations, the requested (at 304) information may exceed the types or amounts of information that authentication system 201-2 is authorized to receive. In such situations, NEF 303 may identify, out of the requested information, which information authentication system 201-2 is authorized to receive.

In some embodiments, in addition to the operations shown in FIG. 3, one or more elements of network 103-1 may perform one or more additional operations related to the request (at 304). For example, NEF 303 may provide some or all of the information included in the request to authentication system 201-1, which may also authenticate UE 101-1 and/or verify that UE 101-1 is authorized to receive the requested service type. For example, authentication system 201-1 may identify one or more policies maintained in UDR 207-1 and/or some other device or system (e.g., a PCF, a PCRF, etc.) of network 103-1. In instances where network 103-1 (e.g., authentication system 201-1) determines that UE 101-1 is not authenticated, not able to be authenticated, is not authorized to receive the requested service, and/or that the request should otherwise not be granted, authentication system 201-1 may respond (e.g., via NEF 303) to the request (at 304) with an indication that the request should be denied (e.g., the requested access should not be provided). In this manner, policies associated with the home network 103-1 of UE 101-1 may be able to be accounted for and adhered to in the authorization of UE 101-1 for access to network 103-2, which is not a home network of UE 103-1.

Assuming, on the other hand, that UE 101-1 is authorized to receive the requested service, and further assuming that authentication system 201-2 is authorized to receive the requested UE information (e.g., that UE 101-1 is not prohibited or restricted from receiving the requested service, and/or that authentication system 201-2 is not prohibited or restricted from receiving the requested UE information), NEF 303 may obtain (at 306) the UE information, which authentication system 201-2 is authorized to receive, from UDR 207-1 and/or some other suitable device or system. In this example, NEF 303 may obtain (at 306) location information, device integrity information, and authentication and/or authorization information associated with UE 101-1. In some embodiments, NEF 303 may obtain (at 306) other information, such as security risk measurement information, role/group information, etc. In some situations, as noted above, authentication system 201-2 may be authorized to request (e.g., at 304) new or "fresh" information (e.g., location information determined within the last 30 seconds, a verification of authentication of UE 101-1 performed after the request (at 304), a verification of device integrity of UE 101-1 performed after the request, etc.). In some situations, NEF 303 and/or UDR 207-1 may communicate with authentication system 201-1, device integrity system 203-1, location determination system 205-1, security risk measurement system 209-1, and/or role-based directory system 211-1 in order to obtain the new or "fresh" information (e.g., where authentication system 201-1, device integrity system 203-1, location determination system 205-1, security risk measurement system 209-1, and/or role-based directory system 211-1 communicates with UE 101-1 and/or otherwise respectively determines the requested information).

NEF 303 may provide (at 308) the requested information to authentication system 201-2. Authentication system 201-2 may also obtain (at 310) information associated with target UE 101-2, such as location information, device integrity information, and authentication information. For example, authentication system 201-2 may obtain (at 310) such information from UDR 207-2 and/or some other suitable device or system.

Authentication system 201-2 may also identify (at 312) an access policy associated with the request. For example, network 103-2 may include policy repository 305, which may be, may include, may be implemented by, may be communicatively coupled to, and/or may be otherwise associated with a Policy Control Function ("PCF"), a Policy Charging and Rules Function ("PCRF"), and/or some other suitable device or system. Policy repository 305 may, for example, may maintain one or more access policies based on information associated with UEs 101 that are associated with network 103-2 as a home network as well as with UEs 101 that are associated with one or more other networks (e.g., network 103-1).

Figure 4:
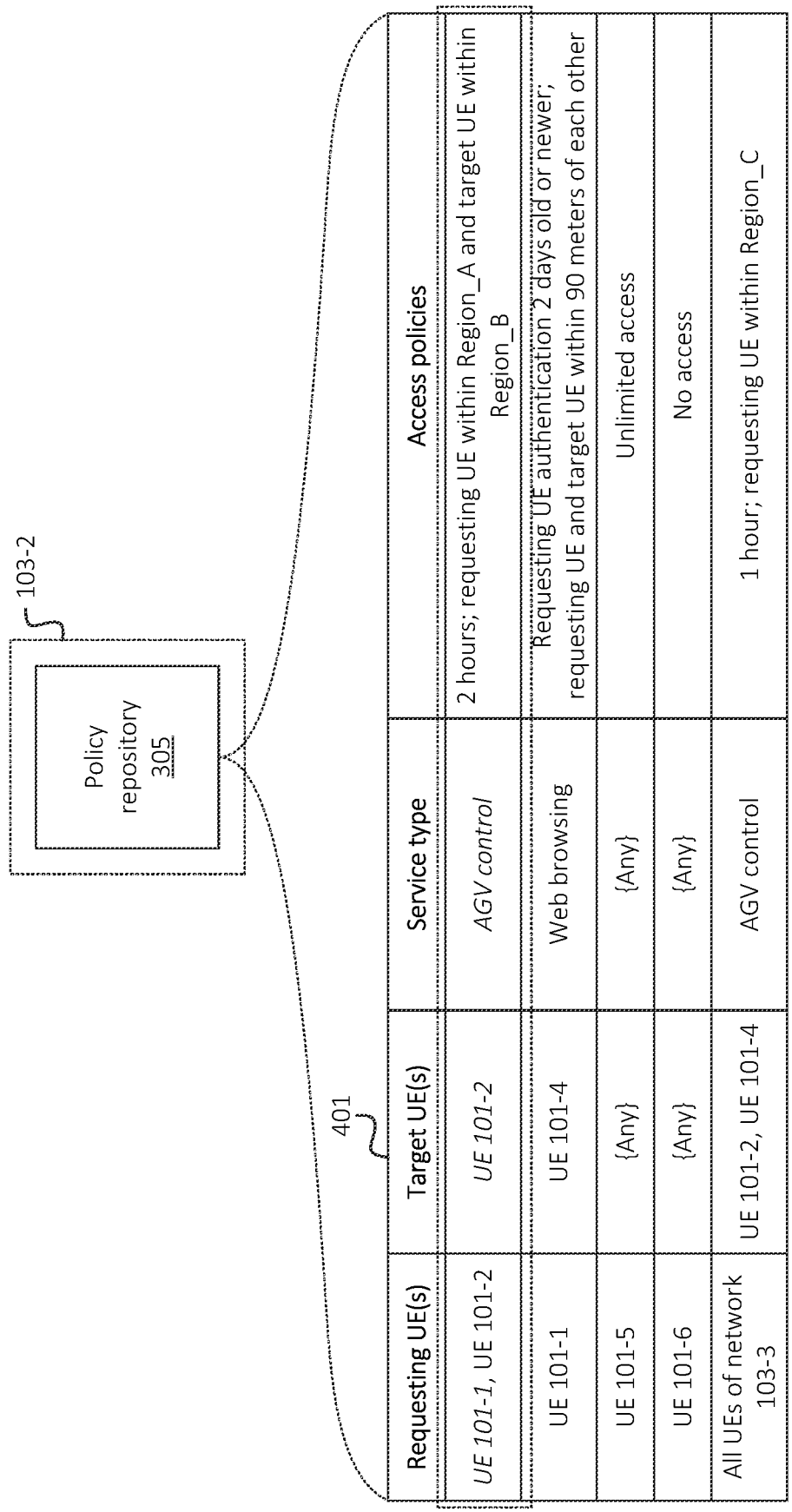
FIG. 4 illustrates an example set of access policies that may be used in a dynamic authentication procedure, in accordance with some embodiments.

For example, as shown in FIG. 4, policy repository 305 may maintain data structure 401, which may include an example set of access policies that may be used (e.g., at 314) by authentication system 201-2 to respond to access requests (e.g., access request 301 from UE 101-1 and/or other requests). In some embodiments, different access policies maintained by policy repository 305 may be associated with different particular requesting UEs or groups of requesting UEs, particular target UEs or groups of target UEs, and/or service types. For example, as shown, a first access policy may be associated with two particular requesting UEs 101-1 and 101-2, and may be associated with a particular target UE 101-2. This access policy may also be associated with the service type "AGV control." Thus, authentication system 201-2 may identify that the example access request 301 matches the criteria of this access policy (denoted by the dashed box and italic lettering in FIG. 4), because the requesting UE 101-1, target UE 101-2, and service type indicated in access request 301 match the criteria indicated in data structure 401. In some embodiments, authentication system 201-2 may perform some other type of suitable similarity analysis to identify the access policy that most closely matches or meets the parameters indicated in access request 301.

As further shown, access policies may include additional conditions or criteria, which may be based on authentication and/or authorization information, device integrity information, location information, and/or other information associated with the requesting UE and/or the target UE. For example, the identified access policy may indicate that requested access should be granted if a location of the requesting UE is within a first geographical region (represented as "Region_A") and if a location of the target UE is within a second geographical region (represented as "Region_B"). The geographical regions may be specified in terms of latitude and longitude coordinates and/or boundaries, city names, cell sector identifiers, physical addresses, and/or other suitable indicators of geographical location.

Access policies may also specify limits or constraints on access if other conditions are met. For example, the identified access policy may specify that, assuming the other conditions are met (e.g., the requesting UE is within Region_A and the target UE is within Region_B), the requesting UE is authorized to access (e.g., receive service from, communicate with, etc.) the target UE for two hours. After the two hours elapse, the authorization for the requesting UE to access the target UE may lapse, and the target UE may cease communicating with or providing service to the requesting UE, and/or one or more network elements of network 103-2 may cease forwarding traffic between the requesting UE and the target UE based on the expiration of this duration.

As additionally shown in FIG. 4, another access policy may be applicable to requesting UE 101-1, target UE 101-4, and a "web browsing" service type. This access policy may specify that the authentication information associated with the requesting UE should be two days old or newer. For example, if authentication system 201-2 receives information indicating (e.g., from a home network of a requesting UE) that the requesting UE has been authenticated three days ago by the home network, then authentication system 201-2 may reject a request from this UE and/or may request that the home network provide a new or "fresh" authentication of the requesting UE. This access policy may further specify that access is granted for the requesting UE to access the target UE if the requesting UE and the target UE are within a particular distance of each other (i.e., 90 meters, in this example). For example, in some embodiments, authentication system 201-2 may periodically or intermittently request (e.g., via a "pull" mechanism) or receive (e.g., via a "push" mechanism) location information from a home network of the requesting UE, and/or may periodically or intermittently monitor location information (e.g., as maintained by UDR 207-2) of the target UE to verify that such UEs remain within 90 meters of each other. In situations where access has previously been granted but conditions change (e.g., where the requesting UE and/or the target UE move such that these UEs are no long within 90 meters of each other), authentication system 201-2 may automatically revoke access for the target UE to provide service or other communications to the requesting UE, and/or vice versa. In some embodiments, authentication system 201-2 may continue to monitor the locations of these UEs and may automatically reauthorize the requesting UE to receive service from or otherwise access the target UE (e.g., without the need for the requesting UE to initiate a subsequent request for access to the target UE).

Data structure 401 may also include information reflecting particular UEs as administrators, blocked devices, etc. For example, as shown, UE 101-5 may be an administrator device, super-user device, etc. with respect to network 103-2, inasmuch as UE 101-5 is authorized to access any target UEs of network 103-2 for any type of service with unlimited access. On the other hand, UE 101-6 may be a blocked device with respect to network 103-2, inasmuch as UE 101-6 is not authorized to access (e.g., "no access") any target UEs of network 103-2 for any type of service.

Data structure 401 may also specify access policies associated with UEs of entire networks or other groups. For example, as shown data structure 401 may include an access policy that is applicable to all UEs of network 103-3, for requests associated with a "AGV control" service directed to target UEs 101-2 and/or 101-4. This access policy may specify that such requesting UEs may access the requested UEs and/or service for one hour, so long as the requesting UEs are within a particular region (represented as "Region_C") at the time of the request and/or so long as the requesting UEs remain within the particular region while accessing the target UEs 101-2 and/or 101-4. As discussed above, access for such requesting UEs may be revoked in instances where such requesting UEs move outside of the particular region. While some examples of access policies, as well as criteria based on which particular access policies may be determined as applicable to particular access requests, are discussed above, access policies maintained by policy repository 305 may include additional, fewer, different, and/or differently arranged access policies in accordance with some embodiments. For example, requesting and/or target UEs 101 may be specified based on attributes, criteria, etc. of such UEs 101. Such attributes, criteria, etc. may include a device type such (e.g., mobile phone, radio-controlled drone, semi-autonomous or remote-controlled robot, AGV, IoT device, etc.), physical attributes (e.g., screen size, device thickness, device weight, etc.), device capabilities (e.g., wireless bands or technologies supported, supported protocols or standards, etc.), labels or categories (e.g., "first responder," "enterprise," "mission critical," etc.), and/or other attributes.

Returning to FIG. 3, once authentication system 201-2 has identified (at 312) the particular access policy that is applicable to access request 301, authentication system 201-2 may determine (at 314) whether to grant or deny the requested access of UE 101-2 by UE 101-1. For example, authentication system 201-2 may make such determination based on the information regarding UE 101-1 (received at 308) as well as the information regarding UE 101-2 (received at 310). Authentication system 201-2 may compare such information, associated with UEs 101-1 and/or 101-2, to the identified (at 312) access policy. In this example, authentication system 201-2 may determine, based on location information of UE 101-1 (received at 308) that UE 101-1 is within Region_A, and may further determine, based on location information of UE 101-1 (received at 310) that UE 101-2 is within Region_B. In this example, authentication system 201-2 may output (at 108) a response to UE 101-1 that UE 101-1 is authorized for the requested access for two hours, in accordance with the identified access policy. Additionally, or alternatively, as discussed above, authentication system 201-2 may notify one or more other elements of network 103-2, such as a gateway, a router, a firewall, target UE 101-2, and/or one or more other devices or systems, that UE 101-1 is authorized to access (e.g., communicate with, receive service from, etc.) UE 101-2 for two hours. In some embodiments, authentication system 201-2 may generate an authentication token or other suitable authentication information and may provide such authentication information to requesting UE 101-1 and/or elements of network 103-2. UE 101-1 and the respective network elements of network 103-2 may accordingly use such authentication and/or authorization information to facilitate the access by requesting UE 101-1 of target UE 101-2. Additionally, or alternatively, such network elements of network 103-2 may be configured with an identifier of UE 101-1, which may be used by the network elements to allow traffic to be sent to and/or received from (e.g., without blocking or dropping such traffic) UE 101-1.

Figure 5:
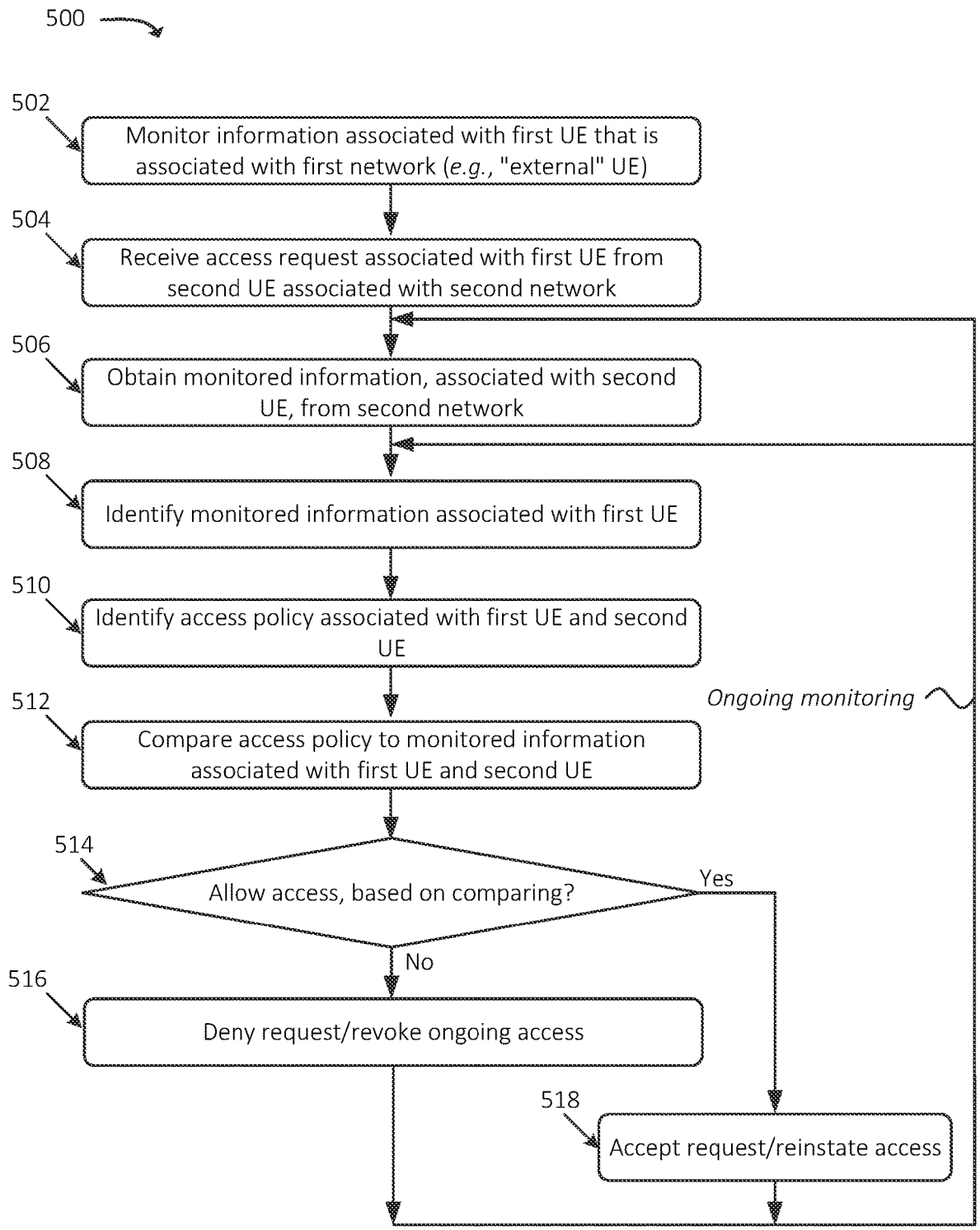
FIG. 5 illustrates an example process for a dynamic authentication of an external UE for access to a network, in accordance with some embodiments.

FIG. 5 illustrates an example process 500 for a dynamic authentication and/or authorization of an external UE for access to a network. In some embodiments, some or all of process 500 may be performed by authentication system 201 (e.g., a first authentication system 201 of a first network 103-1). In some embodiments, one or more other devices may perform some or all of process 500 in concert with, and/or in lieu of, authentication system 201.

As shown, process 500 may include monitoring (at 502) information associated with one or more UEs 101 (e.g., a first UE 101) that is associated with a first network 103. For example, authentication system 201 of the first network 103 may receive, monitor, etc. UE information associated with UEs 101 that are associated with the first network 103 as a "home" network. Such information may be monitored, collected, etc. by devices or systems that are internal to and/or that otherwise implement the first network 103, such as authentication system 201, device integrity system 203, location determination system 205, security risk measurement system 209, role-based directory system 211, and/or some other suitable device or system. As discussed above, the UE information may include authentication information, device integrity information, location information, security risk measurement information, role/group information, and/or other suitable information.

Process 500 may further include receiving (at 504) an access request associated with the first UE 101 from a second UE 101 that is associated with a second network 103. For example, authentication system 201 may receive access request 301 from the second UE 101 and/or some other source, and may identify that access request 301 is associated with the first UE 101. For example, access request 301 may include an identifier of the first UE 101, an identifier of a service provided by the first UE 101, and/or some other information based on which authentication system 201 may identify that the request is associated with the first UE 101. In some embodiments, authentication system 201 may identify that the requesting UE 101 (e.g., the second UE 101) is external, roaming, etc. with respect to the first network 103. For example, authentication system 201 may identify that UDR 207 and/or some other element of the first network 103 does not include information indicating that the second UE 101 is registered with, native to, provisioned by, and/or otherwise associated with the first network 103 as a home network. Additionally, or alternatively, authentication system 201 may identify that UDR 207 and/or some other element of the first network 103 includes information indicating that the second UE 101 is not registered with, is not native to, and/or otherwise is not associated with the first network 103 as a home network (e.g., is a roaming UE, an external UE, etc. with respect to the first network 103). In some embodiments access request 301 may include an identifier of the second network 103, which is a home network of access request 301.

Process 500 may additionally include obtaining (at 506) monitored information, associated with the first UE 101, from the second network 103 (e.g., the home network 103 of UE 101). For example, authentication system 201 may communicate with the second network 103 (e.g., with NEF 303 of the second network 103 and/or some other suitable device, system, interface, etc. of the second network 103) to obtain the requested UE information associated with the second UE 101. In some embodiments, the second network 103 may authenticate the second UE 101 and/or verify that the second UE 101 is authorized to receive the requested service prior to providing the requested UE information to authentication system 201 of the first network 103. The authentication procedure may be performed based on a request from the first network 103 or performed periodically by the second network 103 using continuous authentication procedures dictated by policies associated with the second network 103. As an example, a policy may dictate that the second network 103 re-authenticate the second UE 101 every 3 hours. Similarly, the policies of the first network 103 may require that the first network 103 re-authenticate the first UE 101 every 6 hours.

Process 500 may also include identifying (at 508) monitored information associated with the first UE 101. For example, authentication system 201 may identify information monitored by one or more elements of the first network 103, such as authentication and/or authorization information monitored or generated by authentication system 201, device integrity information monitored or generated by device integrity system 203, location information monitored or generated by location determination system 205, security risk measurement information provided by security risk measurement system 209, role/group information provided by role-based directory system 211, and/or other suitable information. As discussed above, in some embodiments, authentication system 201 may receive such information from UDR 207 of the first network 103 and/or some other suitable device or system (e.g., directly from authentication system 201, device integrity system 203, location determination system 205, security risk measurement system 209, and/or role-based directory system 211).

Process 500 may further include identifying (at 510) an access policy associated with the first UE 101 and the second UE 101. For example, as discussed above, authentication system 201 may identify a set of access policies maintained by policy repository 305 of the first network 103, which may include criteria, conditions, etc. indicating which particular policies are applicable to particular scenarios. The identified access policy may be an exact match, a "best" match, and/or may otherwise be identified based on comparing attributes of the first and/or second UEs 101 (e.g., identifiers, device groups, device types, etc.) to such criteria, conditions, etc.

Process 500 may additionally include comparing (at 512) the identified access policy to the monitored information associated with the first and second UEs 101 to determine whether to allow access to the first network 103 (e.g., to the first UE 101). For example, the determination of whether to allow access may be based on the access request (received at 504) or, as discussed below, a determination of whether to continue to allow access that has previously been granted (e.g., based on continued monitoring (at 504 and/or 506) of the first UE 101 and/or the second UE 101). For example, authentication system 201 may compare location information, authentication information, device integrity information, security risk measurement information, role/group information, and/or other UE information associated with the first and second UEs 101 to conditions, criteria, restrictions, constraints, etc. specified in the identified (at 510) access policy to determine whether to allow access.

If, based on the comparing, authentication system 201 determines that access should not be granted and/or should be denied (at 514—NO), then authentication system 201 may deny (at 516) the request and/or may revoke previously granted (e.g., currently ongoing) access. For example, authentication system 201 may respond to the request (at 504) with an indication that the requested access is not granted. Authentication system 201 may output an indication of why the requested access was not granted, such as an indication of which policy or policies would be violated (e.g., a location-based policy, an authentication-based policy, etc.). In some embodiments, the indication may include and/or may be represented by an error code, report, etc. In some embodiments, Authentication system 201 may perform some other action, such as activating an alarm, contacting law enforcement, adding one or more UEs 101 and/or users to a block list, etc.

In some embodiments, the revocation (at 516) may be a revocation of previously granted access, based on the ongoing monitoring of UEs 101 (e.g., at 504 and/or 506). For example, the policy may have previously not been violated (e.g., UEs 101 may have been within a threshold distance of each other, as indicated by the policy) and access may have previously been granted for the second UE 101 to access the first UE 101, but the first UE 101 and/or the second UE 101 may have moved, thus causing the policy to be violated. As another example, over time, the policy may have been changed, or authentication system 201 may have selected (at 510) a different policy based on differing conditions. As discussed above, denying the request and/or revoking access may include communicating with the first UE 101 and/or one or more other elements of the first network 103 to indicate that the access of the second UE 101 has been denied or revoked, based on which the first UE 101 and/or other elements of the first network 103 may reject traffic, reject requests, and/or otherwise not provide service to the second UE 101.

If, on the other hand, authentication system 201 determines that access should be allowed (at 514—YES), then process 500 may include accepting (at 518) the request and/or reinstating access which was previously revoked, suspended, etc. For example, authentication system 201 may indicate, to the first and/or second UEs 101, that the requested access has been granted. As discussed above, authentication system 201 may indicate, to one or more elements of the first network 103, that the second UE 101 is authorized to communicate with the first UE 101 (e.g., to receive the requested service and/or to otherwise communicate with the first UE 101). Further, in situations where the second UE 101 previously had access to communicate with the first UE 101, but such access was revoked, suspended, etc., such access may be reinstated, restored, etc. In some embodiments, authentication system 201 may, in the absence of a previous request from the second UE 101, maintain (at 518) information indicating that the second UE 101 is eligible to access the first UE 101. For example, authentication system 201 may "precheck" or "preauthorize" the second UE 101 to communicate with the first UE 101, such that in the event that the second UE 101 eventually requests access to the first UE 101, authentication system 201 may utilize such preauthorization information to determine that the second UE 101 is authorized to access the first UE 101.

Figure 6:
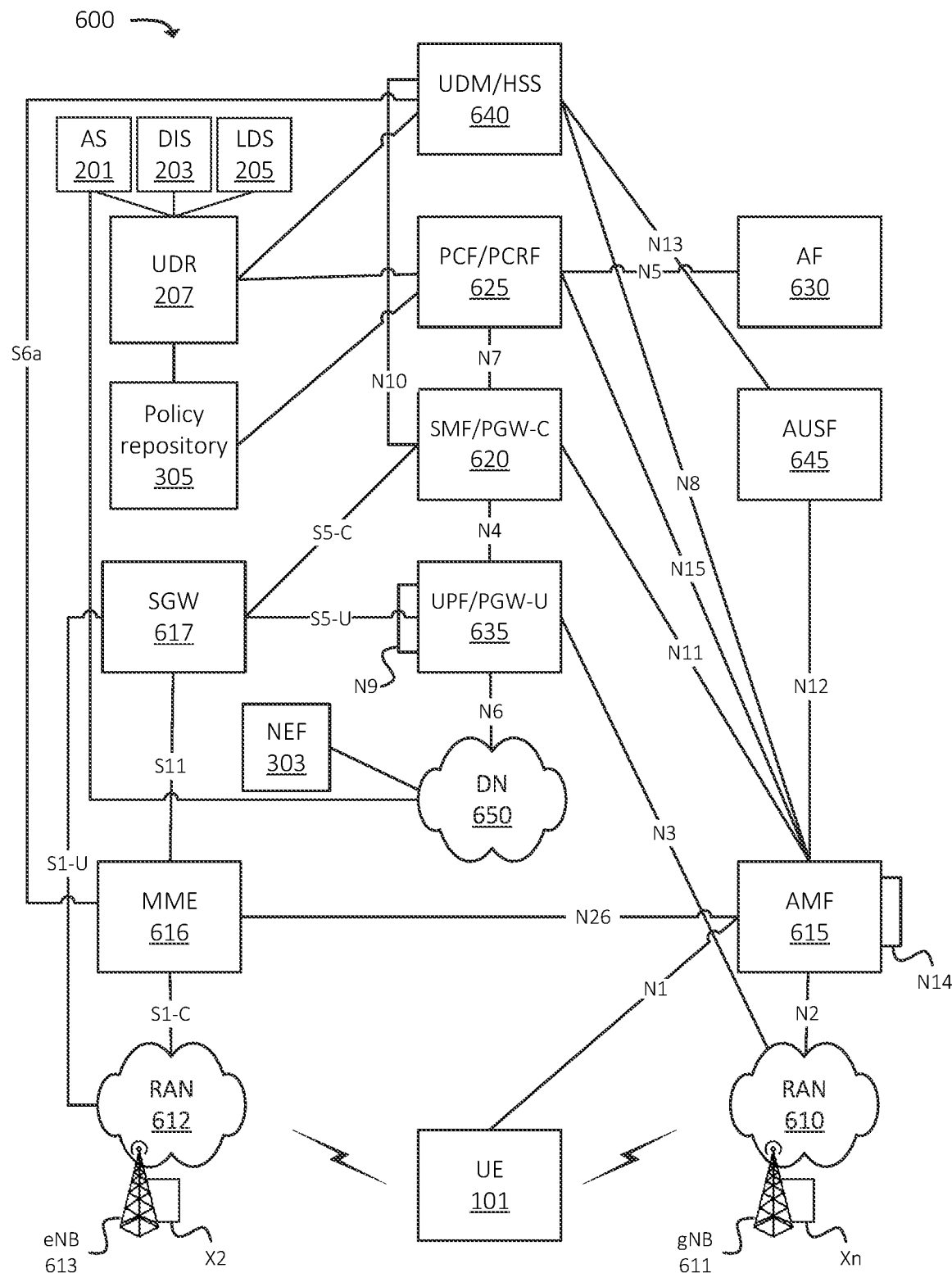
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 101, RAN 610 (which may include one or more Next Generation Node Bs ("gNBs") 611), RAN 612 (which may include one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function PCF/PCRF 625, Application Function ("AF") 630, User Plane Function ("UPF")/PGW-User plane function ("PGW-U") 635, Unified Data Management ("UDM")/Home Subscriber Server ("HSS") 640, and AUSF 645. Environment 600 may also include one or more networks, such as Data Network ("DN") 650. Environment 600 may include one or more additional devices or systems communicatively coupled to one or more networks (e.g., DN 650), such as authentication system 201, device integrity system 203, location determination system 205, UDR 207, security risk measurement system 209, role-based directory system 211, NEF 303, and/or policy repository 305, which may perform one or more operations as discussed above.

The example shown in FIG. 6 illustrates one instance of each network component or function (e.g., one instance of SMF/PGW-C 620, PCF/PCRF 625, UPF/PGW-U 635, UDM/HSS 640, and/or AUSF 645). In practice, environment 600 may include multiple instances of such components or functions. For example, in some embodiments, environment 600 may include multiple "slices" of a core network, where each slice includes a discrete and/or logical set of network functions (e.g., one slice may include a first instance of SMF/PGW-C 620, PCF/PCRF 625, UPF/PGW-U 635, UDM/HSS 640, and/or AUSF 645, while another slice may include a second instance of SMF/PGW-C 620, PCF/PCRF 625, UPF/PGW-U 635, UDM/HSS 640, and/or AUSF 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Elements of environment 600 may interconnect with each other and/or other devices via wired connections, wireless connections, or a combination of wired and wireless connections. Examples of interfaces or communication pathways between the elements of environment 600, as shown in FIG. 6, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N2 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 6, such as Service-Based Interfaces ("SBIs"), including an Namf interface, an Nudm interface, an Npcf interface, an Nupf interface, an Nnef interface, an Nsmf interface, and/or one or more other SBIs.

In some embodiments, environment 600 may be, may include, may be implemented by, and/or may be communicatively coupled to a respective network 103. For example, network 103-1 may include one instance or implementation of environment 600, and network 103-2 may include a different and/or separate instance or implementation of environment 600. As another example, network 103-1 may include some or all of the elements of environment 600, while network 103-2 may include different or differently arranged elements. In some embodiments, network 103-1 may include a first instance or implementation of authentication system 201, device integrity system 203, location determination system 205, UDR 207, and/or one or more other elements, while network 103-2 may include a different second instance or implementation of authentication system 201, device integrity system 203, location determination system 205, UDR 207, and/or one or more other elements.

UE 101 may include a computation and communication device, such as a wireless mobile communication device that is capable of communicating with RAN 610, RAN 612, and/or DN 650. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 101 may communicate with one or more other elements of environment 600. UE 101 may communicate with RAN 610 via an air interface (e.g., as provided by gNB 611). For instance, RAN 610 may receive traffic (e.g., user plane traffic such as voice call traffic, data traffic, messaging traffic, etc.) from UE 101 via the air interface, and may communicate the traffic to UPF/PGW-U 635 and/or one or more other devices or networks. Further, RAN 610 may receive signaling traffic, control plane traffic, etc. from UE 101 via the air interface, and may communicate such signaling traffic, control plane traffic, etc. to AMF 615 and/or one or more other devices or networks. Additionally, RAN 610 may receive traffic intended for UE 101 (e.g., from UPF/PGW-U 635, AMF 615, and/or one or more other devices or networks) and may communicate the traffic to UE 101 via the air interface.

RAN 612 may be, or may include, a LTE RAN that includes one or more base stations (e.g., one or more eNBs 613), via which UE 101 may communicate with one or more other elements of environment 600. UE 101 may communicate with RAN 612 via an air interface (e.g., as provided by eNB 613). For instance, RAN 612 may receive traffic (e.g., user plane traffic such as voice call traffic, data traffic, messaging traffic, signaling traffic, etc.) from UE 101 via the air interface, and may communicate the traffic to UPF/PGW-U 635 (e.g., via SGW 617) and/or one or more other devices or networks. Further, RAN 612 may receive signaling traffic, control plane traffic, etc. from UE 101 via the air interface, and may communicate such signaling traffic, control plane traffic, etc. to MME 616 and/or one or more other devices or networks. Additionally, RAN 612 may receive traffic intended for UE 101 (e.g., from UPF/PGW-U 635, MME 616, SGW 617, and/or one or more other devices or networks) and may communicate the traffic to UE 101 via the air interface.

AMF 615 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 101. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 101, from DN 650, and may forward the user plane data toward UE 101 (e.g., via RAN 610, SMF/PGW-C 620, and/or one or more other devices). In some embodiments, multiple UPFs 635 may be deployed (e.g., in different geographical locations), and the delivery of content to UE 101 may be coordinated via the N9 interface (e.g., as denoted in FIG. 6 by the line marked "N9" originating and terminating at UPF/PGW-U 635). Similarly, UPF/PGW-U 635 may receive traffic from UE 101 (e.g., via RAN 610, RAN 612, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

UDM/HSS 640 and AUSF 645 may include one or more devices, systems, VNFs, CNFs, etc., that manage, update, and/or store, in one or more memory devices associated with AUSF 645 and/or UDM/HSS 640, profile information associated with a subscriber. AUSF 645 and/or UDM/HSS 640 may perform authentication, authorization, and/or accounting operations associated with the subscriber and/or a communication session with UE 101.

UDR 207 may include one or more devices, systems, VNFs, CNFs, etc., that, as discussed above, receive information from authentication system 201, device integrity system 203, location determination system 205, security risk measurement system 209, and/or role-based directory system 211. In some embodiments, UDR 207 and/or one or more other devices or systems may receive information (e.g., associated with one or more UEs 101 that are associated with a network implemented by environment 600 as a home network) from one or more other sources. For example, UDR 207 and/or policy repository 305 may receive policy information from PCF/PCRF 625 and/or some other source. In some embodiments, UDR 207 and/or authentication system 201 may receive UE authentication information from UDM/HSS 640, UE 101, and/or some other source. As another example, UDR 207 and/or device integrity system 203 may receive device integrity information from UDM/HSS 640, UE 101, and/or some other source. In some embodiments, UDR 207 and/or location determination system 205 may receive UE location information from AMF 615, MME 616, UE 101, and/or some other suitable device or system. In some embodiments, UDR 207 may receive risk scores computed and/or otherwise provided by security risk measurement system 209. Similarly, UDR 207 may receive role and/or group information associated with one or more UEs 101 from a directory that is updated regularly when a role associated with such UEs 101 change, such as role-based directory system 211.

NEF 303 may include one or more devices, systems, VNFs, CNFs, etc., that perform one or more operations discussed above. For example, NEF 303 may maintain authentication and/or authorization information indicating devices or systems, external to a particular network 103 implemented by environment 600, that are authorized to receive information associated with such network 103. Further, NEF 303 may maintain authorization information indicating types or other attributes, constraints, limits, etc. on information that is authorized to be provided to such external device or system. In some embodiments, NEF 303 may receive UE information, as discussed above, from UDR 207 and/or one or more other sources, and may provide some or all such information to an authorized device or system (e.g., a particular authentication system 201 of some other network 103).

DN 650 may include one or more wired and/or wireless networks. For example, DN 650 may include an Internet Protocol IP-based PDN, a wide area network ("WAN") such as the Internet, a private enterprise network, and/or one or more other networks. UE 101 may communicate, through DN 650, with data servers, other UEs 101, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 101 may communicate.

Figure 7:
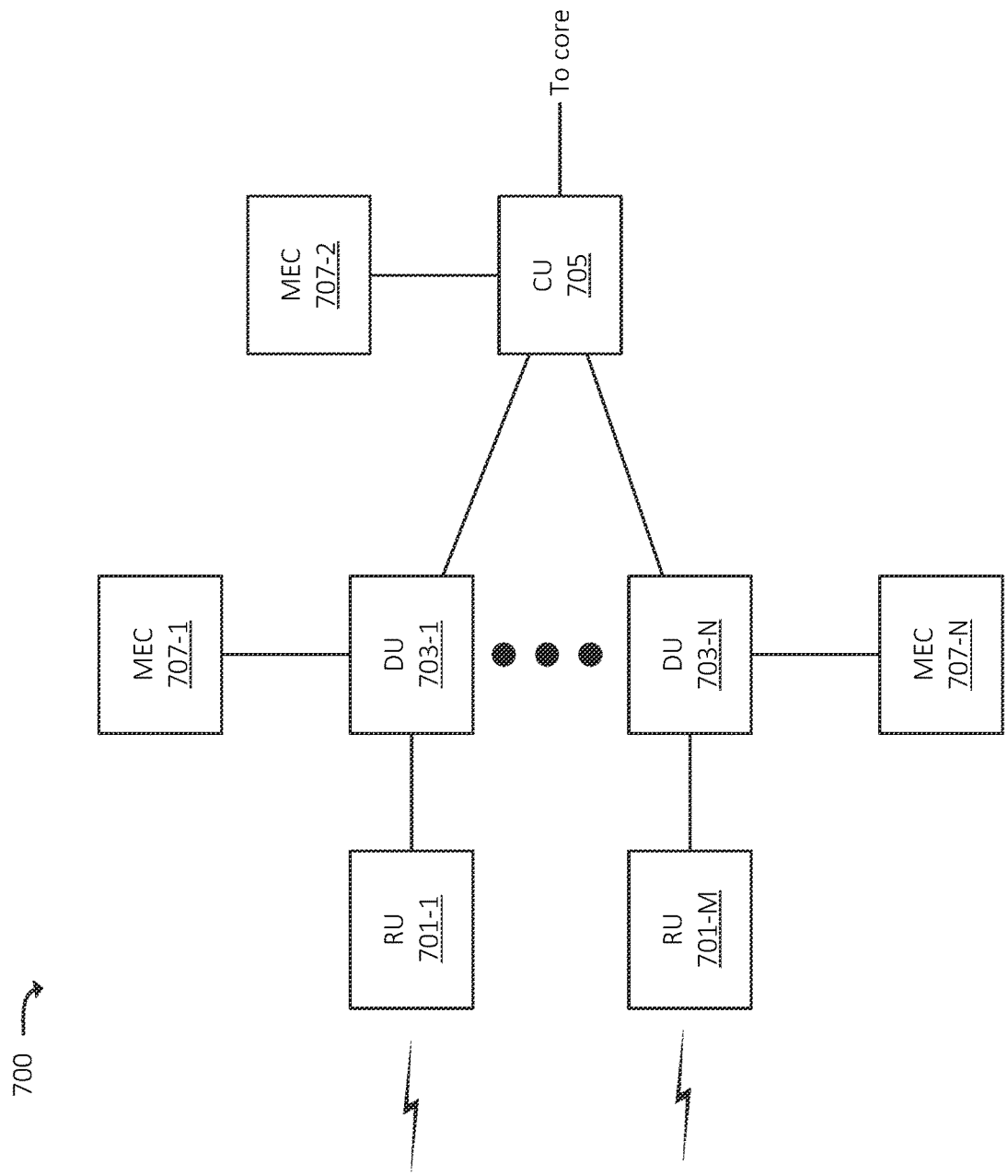
FIG. 7 illustrates an example arrangement of a radio access network ("RAN"), in accordance with some embodiments.

FIG. 7 illustrates an example RAN environment 700, which may be included in and/or implemented by one or more RANs (e.g., RAN 610, RAN 612, or some other RAN). In some embodiments, a particular RAN may include one RAN environment 700. In some embodiments, a particular RAN may include multiple RAN environments 700. In some embodiments, RAN environment 700 may correspond to a particular gNB 611 of a 5G RAN (e.g., RAN 610). In some embodiments, RAN environment 700 may correspond to multiple gNBs 611. In some embodiments, RAN environment 700 may correspond to one or more other types of base stations of one or more other types of RANs. As shown, RAN environment 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 101 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 101, and may determine which DU(s) 703 should receive the downlink traffic. DU 703 may include one or more devices that transmit traffic between a core network (e.g., via CU 705) and UE 101 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 101.

RU 701 may include hardware circuitry (e.g., one or more RF transceivers, antennas, radios, and/or other suitable hardware) to communicate wirelessly (e.g., via an RF interface) with one or more UEs 101, one or more other DUs 703 (e.g., via RUs 701 associated with DUs 703), and/or any other suitable type of device. In the uplink direction, RU 701 may receive traffic from UE 101 and/or another DU 703 via the RF interface and may provide the traffic to DU 703. In the downlink direction, RU 701 may receive traffic from DU 703, and may provide the traffic to UE 101 and/or another DU 703.

One or more elements of RAN environment 700 may, in some embodiments, be communicatively coupled to one or more Multi-Access/Mobile Edge Computing ("MEC") devices, referred to sometimes herein simply as "MECs" 707. For example, DU 703-1 may be communicatively coupled to MEC 707-1, DU 703-N may be communicatively coupled to MEC 707-N, CU 705 may be communicatively coupled to MEC 707-2, and so on. MECs 707 may include hardware resources (e.g., configurable or provisionable hardware resources) that may be configured to provide services and/or otherwise process traffic to and/or from UE 101, via a respective RU 701.

For example, DU 703-1 may route some traffic, from UE 101, to MEC 707-1 instead of to a core network via CU 705. MEC 707-1 may process the traffic, perform one or more computations based on the received traffic, and may provide traffic to UE 101 via RU 701-1. In some embodiments, MEC 707 may include, and/or may implement, some or all of the functionality described above with respect to AF 630, UPF 635, and/or one or more other devices, systems, VNFs, CNFs, etc. In this manner, ultra-low latency services may be provided to UE 101, as traffic does not need to traverse DU 703, CU 705, links between DU 703 and CU 705, and an intervening backhaul network between RAN environment 700 and the core network.

Figure 8:
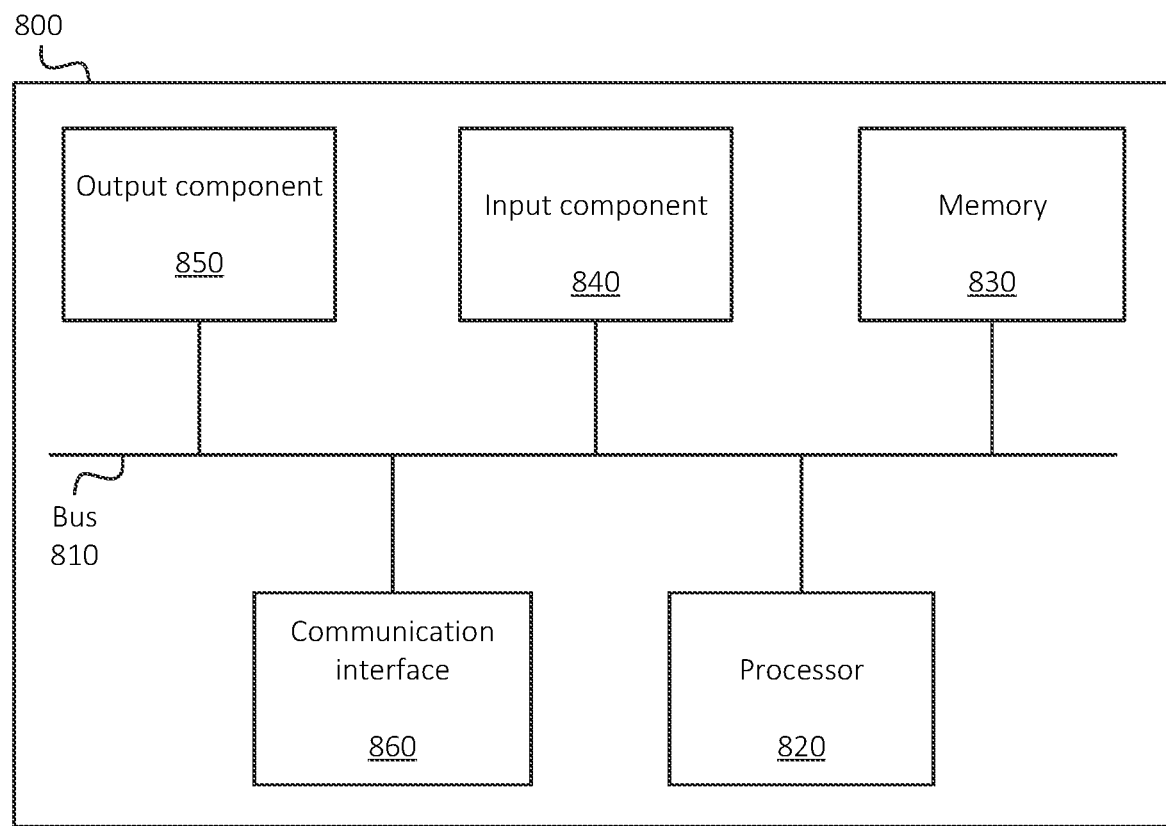
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. In some embodiments, processor 820 may be or may include one or more hardware processors. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to input component 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
  one or more processors configured to:
    monitor information associated with a set of User Equipment ("UEs") associated with a first network;
    receive an access request, for access to a first UE of the set of UEs, from a second UE associated with a second network;
    obtain, based on the access request and from the second network, monitored information associated with the second UE;
    identify monitored information associated with the first UE;
    identify a particular access policy that is associated with the first UE and the second UE;
    identify, based on the particular access policy, the monitored information associated with the first UE, and the monitored information associated with the second UE, whether to grant or deny the access request; and
    output, in response to the access request, an indication of whether the access request is granted or denied.

2. The device of claim 1, wherein the monitored information associated with the first UE is determined by one or more devices of the first network that communicate with the first UE.

3. The device of claim 1, wherein the monitored information associated with the first UE includes location information associated with the first UE, and wherein the monitored information associated with the second UE includes location information associated with the second UE.

4. The device of claim 1, wherein the first network is a home network of the first UE, and wherein the second network is a home network of the second UE.

5. The device of claim 4, wherein the access request indicates that the second network is the home network of the second UE, wherein the one or more processors are further configured to:
  communicate with the second network to obtain the monitored information associated with the second UE based on the indication that the second network is the home network of the second UE.

6. The device of claim 1, wherein the second network is a private network that utilizes wireless network infrastructure provided by the first network.

7. The device of claim 1, wherein the access request includes a service type, wherein identifying the particular access policy further includes identifying that the particular access policy is associated with the requested service type.

8. A non-transitory computer-readable medium, storing a plurality of processor-executable instructions to:
  monitor information associated with a set of User Equipment ("UEs") associated with a first network;
  receive an access request, for access to a first UE of the set of UEs, from a second UE associated with a second network;
  obtain, based on the access request and from the second network, monitored information associated with the second UE;
  identify monitored information associated with the first UE;
  identify a particular access policy that is associated with the first UE and the second UE;
  identify, based on the particular access policy, the monitored information associated with the first UE, and the monitored information associated with the second UE, whether to grant or deny the access request; and
  output, in response to the access request, an indication of whether the access request is granted or denied.

9. The non-transitory computer-readable medium of claim 8, wherein the monitored information associated with the first UE is determined by one or more devices of the first network that communicate with the first UE.

10. The non-transitory computer-readable medium of claim 8, wherein the monitored information associated with the first UE includes location information associated with the first UE, and wherein the monitored information associated with the second UE includes location information associated with the second UE.

11. The non-transitory computer-readable medium of claim 8, wherein the first network is a home network of the first UE, and wherein the second network is a home network of the second UE.

12. The non-transitory computer-readable medium of claim 11, wherein the access request indicates that the second network is the home network of the second UE, wherein the plurality of processor-executable instructions further include processor-executable instructions to:
  communicate with the second network to obtain the monitored information associated with the second UE based on the indication that the second network is the home network of the second UE.

13. The non-transitory computer-readable medium of claim 8, wherein the second network is a private network that utilizes wireless network infrastructure provided by the first network.

14. The non-transitory computer-readable medium of claim 8, wherein the access request includes a service type, wherein identifying the particular access policy further includes identifying that the particular access policy is associated with the requested service type.

15. A method, comprising:
    monitoring information associated with a set of User Equipment ("UEs") associated with a first network;
    receiving an access request, for access to a first UE of the set of UEs, from a second UE associated with a second network;
    obtaining, based on the access request and from the second network, monitored information associated with the second UE;
    identifying monitored information associated with the first UE;
    identifying a particular access policy that is associated with the first UE and the second UE;
    identifying, based on the particular access policy, the monitored information associated with the first UE, and the monitored information associated with the second UE, whether to grant or deny the access request; and
    outputting, in response to the access request, an indication of whether the access request is granted or denied.

16. The method of claim 15, wherein the monitored information associated with the first UE is determined by one or more devices of the first network that communicate with the first UE.

17. The method of claim 15, wherein the monitored information associated with the first UE includes location information associated with the first UE, and wherein the monitored information associated with the second UE includes location information associated with the second UE.

18. The method of claim 15, wherein the first network is a home network of the first UE, and wherein the second network is a home network of the second UE, wherein the access request indicates that the second network is the home network of the second UE, the method further comprising:
    communicating with the second network to obtain the monitored information associated with the second UE based on the indication that the second network is the home network of the second UE.

19. The method of claim 15, wherein the second network is a private network that utilizes wireless network infrastructure provided by the first network.

20. The method of claim 15, wherein the access request includes a service type, wherein identifying the particular access policy further includes identifying that the particular access policy is associated with the requested service type.

* * * * *